US006947446B2

(12) United States Patent
LoGalbo et al.

(10) Patent No.: US 6,947,446 B2
(45) Date of Patent: Sep. 20, 2005

(54) SLOT FORMAT AND ACKNOWLEDGEMENT METHOD FOR A WIRELESS COMMUNICATION SYSTEM

(75) Inventors: Robert D. LoGalbo, Hoffman Estates, IL (US); Alan P. Conrad, St. Charles, IL (US); Gregory A. Dertz, Algonquin, IL (US); Bradley M. Hiben, Glen Ellyn, IL (US); Donald G. Newberg, Hoffman Estates, IL (US)

(73) Assignee: Motorola, Inc., Schaumburg, IL (US)

( * ) Notice: Subject to any disclaimer, the term of this patent is extended or adjusted under 35 U.S.C. 154(b) by 371 days.

(21) Appl. No.: 09/760,981

(22) Filed: Jan. 16, 2001

(65) Prior Publication Data

US 2002/0093928 A1 Jul. 18, 2002

(51) Int. Cl.$^7$ .................................................. H04J 3/22
(52) U.S. Cl. ......................... 370/468; 370/473; 714/748
(58) Field of Search ................................ 370/230, 231, 370/235, 352, 353, 354, 355, 465, 468, 473, 474, 477; 714/1, 18, 748, 749, 750, 751

(56) References Cited

U.S. PATENT DOCUMENTS

| | | | |
|---|---|---|---|
| 5,717,689 A | | 2/1998 | Ayanoglu |
| 5,878,351 A | * | 3/1999 | Alanara et al. ............. 455/466 |
| 5,970,063 A | * | 10/1999 | Chapman et al. ........... 370/346 |
| 6,172,971 B1 | * | 1/2001 | Kim ............................ 370/348 |
| 6,608,832 B2 | * | 8/2003 | Forslöw ...................... 370/353 |

FOREIGN PATENT DOCUMENTS

EP          0 634 854 A2      1/1995

OTHER PUBLICATIONS

Polyzos et al, Ehancing Wireless Internet Links for Multimedia Services, Workshop on Mobile Multimedia Communications, pp. 1–6, Oct. 1998.*

Xylomenos et al, Enhancing Wireless Internet Links, ICT, pp. 1–4, 1998.*

Choi et al, A Celluar Wireless Local Area Network with QoS Guarantees for Heterogeneous Traffic, ACM, pp. 1–21, 1997.*

Immonen, QoS in GPRS and UMTS, Tampere University of Technology, pp. 1–25, 2000.*

Hari Balakrishnan, et al.; A Comparison of Mechanisms for Improving TCP Performance Over Wireless Links; ACM SIGCOMM '96, Stanford, CA, Aug. 1996; pp. 1–14.

CJ Fenton, et al.; Mobile Data Services, BT Tech Journal, vol. 14, No. 3, Jul. 1996, pp. 92–108.

Almguist; Type of Service in the Internet Protocol Suite, RFC 1349, http://ietf.org./rfc/rfc1349, Jul. 1992, pp. 1–25.

Chakraborty, Mobile Multimedia: In Context to ATM Transport and GSM/SPRS Mobile Access Networks, IEEE, 1995, pp. 1937–1941.

Xylomenos, et al.; Link Layer Support For Quality of Service on Wireless Internet Links, University of California, Jan. 4, 2000, pp. 1–18.

* cited by examiner

Primary Examiner—Frank Duong
(74) Attorney, Agent, or Firm—Indira Saladi; Steven R. Santema

(57) ABSTRACT

A slot format and acknowledgment method for use in a communication network that contains one or more wireless links. The slot format provides for the segmenting and reassembly of packets for transport over a wireless link. It also provides support for multiple types of service for the data being carried over the wireless link as well as allocating of access to the wireless link among a plurality of communication units. The acknowledgment method provides for detection of errors over the wireless link, the selective acknowledgment of error-free transmissions and the selective resending of transmissions received in error.

7 Claims, 8 Drawing Sheets

SLOT FORMAT AND ACKNOWLEDGEMENT METHOD FOR A WIRELESS COMMUNICATION SYSTEM

FIELD OF THE INVENTION

This invention relates generally to communication systems and more particularly to a communication system slot format that is useful for transferring both error-intolerant and delay-intolerant data, including but not limited to multimedia data over at least one wireless link.

BACKGROUND OF THE INVENTION

Communication systems, such as land mobile radio and cellular communications systems, are well known. Such systems typically include a plurality of radio communication units (e.g., vehicle-mounted mobiles or portable radios in a land mobile system and radio/telephones in a cellular system), one or more repeaters (e.g. non-portable radios usually located at a fixed repeater site) and other equipment used in the processing and monitoring of communications. The repeaters are typically connected to other fixed portions of the system (i.e., the infrastructure) via wire connections, whereas the repeaters communicate with communication units and/or other repeaters within the coverage area of their respective sites via a wireless link. That is, the repeaters transmit and receive information via radio frequency (RF) communication resources, typically comprising voice and/or data resources such as, for example, narrow band frequency modulated channels, time division modulated slots, carrier frequencies, frequency pairs, etc. that support wireless communications within their respective sites.

Communication systems may be classified as circuit-switched or packet-switched, referring to the way data is communicated between endpoints. Historically, radio communication systems have used circuit-switched architectures, where each endpoint (e.g., repeater and console sites) is linked, through dedicated or on-demand circuits, to a central radio system switching point, or "central switch." The circuits providing connectivity to the central switch require a dedicated wire for each endpoint whether or not the endpoint is participating in a particular call. More recently, communication systems are beginning to use packet-switched networks using the Internet Protocol (IP). In packet-switched networks, the data that is to be transported between endpoints (or "hosts" in IP terminology) is divided into IP packets called datagrams. The datagrams include addressing information (e.g., source and destination addresses) that enables various routers forming an IP network to route the packets to the specified destination. Packet-switched networks are considered to be more efficient than circuit-switched networks because they do not require dedicated bandwidth or connections between endpoints, but rather permit communications between multiple endpoints to proceed concurrently over shared paths or connections.

In communication systems, time division multiple access (TDMA) is a commonly used technique for multiple radio communication units to share wireless links. In TDMA, the wireless links are divided into slices of time called slots. The radio communication units take turns receiving and transmitting in the different slots. In most TDMA communication systems, all of the slots are the same length of time. However, this creates a problem when the slots are used to carry packets using IP since IP packets are of variable length. The IP packets must be split among multiple slots and reassembled in the correct order.

The Internet Protocol was designed to be used in wireline communication networks employing a combination of ethernet, fiber optic links, T1 lines, etc. Such a network has a very low rate of errors in transmission of packets across the network. For this reason, IP contains no mechanism for detection of errors and retransmission of packets received with errors. The Transport Control Protocol (TCP) is often used in conjunction with IP to provide error detection and retransmission of errors. When this is done, the network is usually referred to as a TCP/IP network. A device running TCP performs detection of errors of the IP packets only at the destination endpoint. When a destination endpoint device running TCP detects an error, the packet must be transmitted from the source to the destination endpoint.

A wireless link has a much higher error rate than the wireline links traditionally used in networks employing IP. Hence, a TCP/IP communication network containing wireless links will have a high rate of packet retransmissions. These packets will have to be transmitted from one endpoint of communication to the other rather then just over the wireless link where the error occurred. Additionally, if the IP packets are split among multiple TDMA slots when transmitted over a wireless link and only one slot contains errors, the entire packet will have to be retransmitted. Such a TCP/IP communication network will have a higher traffic rate and greater delays than an all wireline communication network.

Not all packets carried in an IP network require the same kind of performance in terms of delay and level of errors. For example, a voice call between two communication units can tolerate only small delays but may be able to tolerate a certain number of errors without noticeably effecting voice quality. However, a data transfer between two computers may require error-free transmission but delay would be unimportant. Any methods of compensating for the error prone nature of the wireless links must take into account the differing types of service required for different uses of the communication network.

Accordingly, there is a need for a packet based communication system that takes into account the error-prone nature of wireless links. Such a communication system should provide for the splitting and reassembly of packets over TDMA wireless links. Additionally, the communication network should provide for the detection of errors and retransmission of portions of packets over the wireless links when necessary while taking into account the unique needs of different types of network traffic. The present invention is directed to addressing these needs.

BRIEF DESCRIPTION OF THE DRAWINGS

The foregoing and other advantages of the invention will become apparent upon reading the following detailed description and upon reference to the drawings in which.

DESCRIPTION OF A PREFERRED EMBODIMENT

In one embodiment of the present invention, there is provided a method comprising the steps of identifying, for a packet to be transmitted over a wireless link, a type of service from among at least a first and second type of service. An acknowledgement requirement corresponding to the type of service is determined. A slot comprising at least a portion of the packet is sent from a sending device to a receiving device. The receiving device performs the acknowledgement requirement corresponding to the type of service based on the error status of the slot.

In another embodiment of the present invention, there is provided a method comprising the steps of a repeater receiving a first block of data from a first device. The repeater determines if the first block of data requires acknowledgement. If the repeater determines that the first block of data requires acknowledgement, the repeater forms a time slot including a second block of data targeted for a second device and indicia of acknowledgement of the first block of data. The repeater transmits the time slot.

In still another embodiment of the present invention, there is provided a method comprising a communication unit receiving N blocks of data. The communication unit determines a subset of the N blocks of data that must be acknowledged. A repeater in communication with the communication unit allocates an acknowledgement time slot for use by the communication unit. The communication unit then sends an acknowledgement structure within the allocated acknowledgement time slot.

In yet another embodiment of the present invention, there is provided a method comprising the steps of a sending device determining that a first communication unit should be assigned a future time slot. The sending device forms a time slot comprising an identification of the first communication unit and data destined for a second communication unit. The sending device sends the time slot.

In yet another embodiment of the present invention, there is provided a slot comprising a source identification number field for identifying a sending device; a destination identification number field for identifying a receiving device; a block number field for identifying the segment of a first packet carried in the slot; a packet number field for identifying the first packet; a total number of blocks field for specifying how many segments the first packet has been divided into; a last block length field for specifying the size of the last segment of the first packet; and one or more blocks of data, each block of data containing a segment of the first packet.

Figure 1:
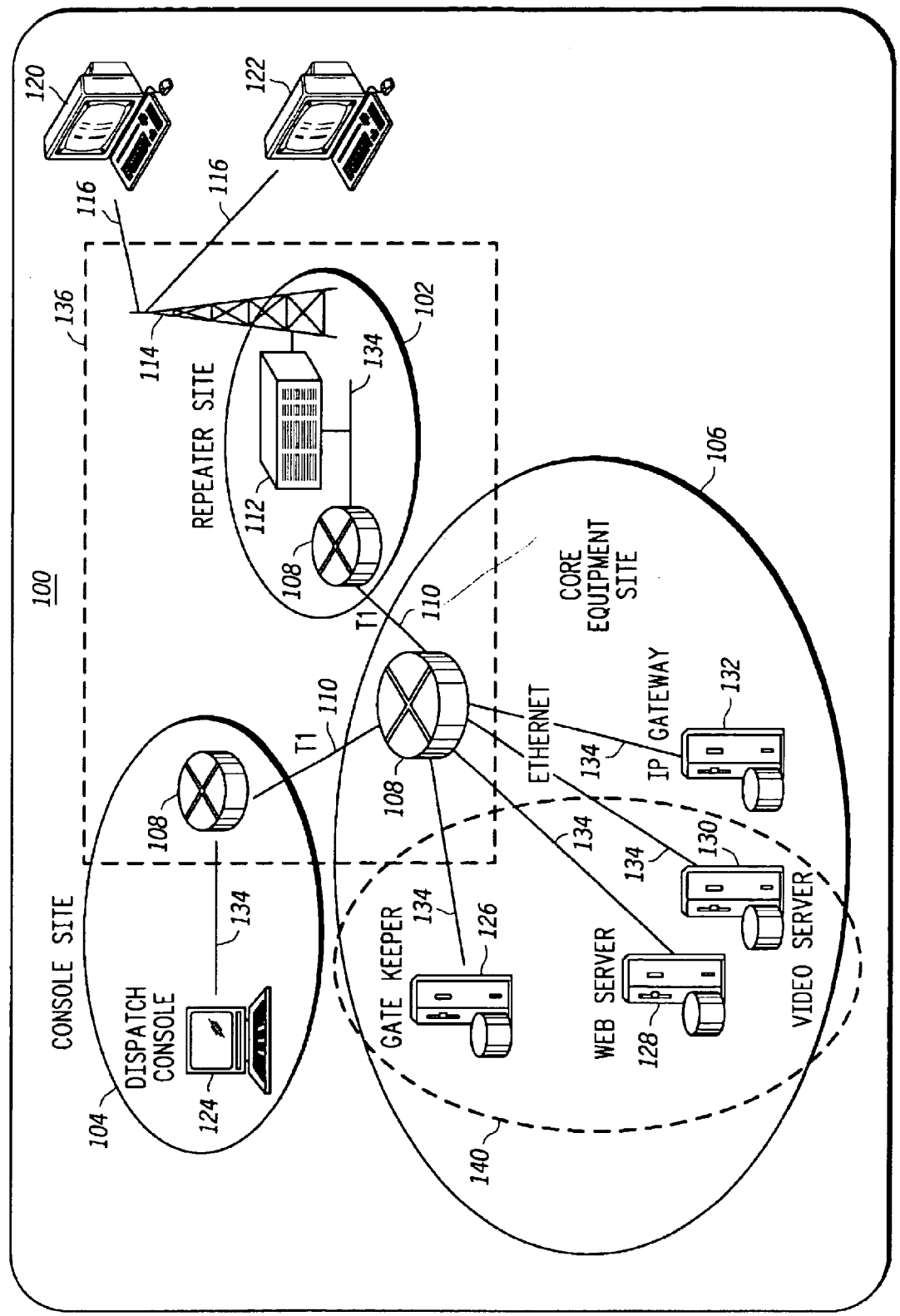
FIG. 1 shows a communication network that includes one or more wireless links according to one embodiment of the present invention.

Turning now to the drawings and referring initially to FIG. 1, there is shown a multimedia communication system ("network") 100 comprising a repeater site 102, console site 104 and core equipment site 106 having associated routers 108 interconnected by T1 or other appropriate links 110. The repeater site 102 includes a repeater 112 that is coupled, via a wireless link 116 with communication units 120, 122 within the repeater's geographic coverage area. The console site 104 includes a dispatch console 124. As shown, the dispatch console 124 is a wireline console. However, it will be appreciated that the console may be a wireless or wireline console. The core equipment site 106 can include a gatekeeper 126, web server 128, video server 130, IP Gateway 132 or other equipment. As will be appreciated, the communication system 100 may include multiple repeater sites, console sites and/or core equipment sites, having fewer or greater numbers of equipment, having fewer or greater numbers of communication units and/or having equipment distributed among the sites in a different manner than shown in FIG. 1. As will be further appreciated each repeater site may include multiple repeaters that are coupled over different wireless links with communication units.

In one embodiment, the communication units 120, 122 comprise wireless radio terminals that are equipped for 2-way communication of IP datagrams (or packets) associated with multimedia calls (e.g., voice, data or video, including but not limited to high-speed streaming voice and video) and data transfers singly or simultaneously with other hosts in the communication system 100. In such case, the communication units 120, 122 include the necessary call control, voice and video coding, and user interface needed to make and receive multimedia calls. As will be appreciated, however, the communication units may comprise virtually any mobile or portable wireless radio units, cellular radio/telephones, devices having varying capacities to accommodate multimedia calls, portable computers with wireless modems, or any other wireless device with the need for packet based data communication. For example, it is envisioned that some communication units may be able to transceive voice and data, not video; other communication units may be able to receive but not transmit video; while still other communication units may be able to transceive only data, and so forth.

In one embodiment, repeater 112, communication units 120, 122, dispatch console 124, gatekeeper 126, web server 128, video server 130 and IP Gateway 132 all comprise IP host devices that are able to send and receive IP datagrams between other host devices of the network. For convenience, the communication units 120, 122 will be referred to as "wireless host devices." As will be appreciated, the wireless host devices may also include wireless consoles or other types of wireless devices. All other host devices of FIG. 1 will be referred to as "fixed equipment" host devices. Each host device has a unique IP address. The host devices include respective processors (which may comprise, for example, microprocessors, microcontrollers, digital signal processors or combination of such devices) and memory (which may comprise, for example, volatile or nonvolatile digital storage devices or combination of such devices).

In one embodiment, the fixed equipment host devices at the respective sites are connected to their associated routers 108 via wireline connections (e.g., Ethernet links 134 or some other suitable connection) and the routers themselves are also connected by wireline connections (e.g., T1 links or fiber optic links) or alternately fixed point-to-point microwave links. These wireline connections thus comprise a wireline packet switched infrastructure ("packet network") 136 for routing IP datagrams between the fixed equipment host devices. One of the unique aspects of the present invention is the extension of IP host functionality to the wireless host devices (e.g., the communication units 120, 122) over a wireless link 116. For convenience, the term "wireless packet network" will hereinafter define a packet network that extends over at least one wireless link to a wireless host device as described herein.

In one embodiment, the repeater 112 is a device whose functions include receiving and sending datagrams over the wireline network, segmenting and formatting datagrams for transmission over the wireless link 116, prioritizing data for transmission over the wireless link 116, controlling access of the communication units 120, 122 to the wireless link 116, and sending and receiving radio signals over the wireless link 116. In other embodiments the functions of the repeaters 112 may be split over multiple devices. For example, the repeater may be split into a wireless link manager and a base station. The wireless link manager will receive and send datagrams over the wireline network, segment and format datagrams for transmission over the wireless link 116, prioritize data for transmission over the wireless link 116 and control access of the communication units 120, 122 to the wireless link 116 while the basestation sends and receives radio signals over the wireless link 116. In such an embodiment, multiple base stations can be attached to a single wireless link manager. As will be appreciated, other embodiments of devices with the functions of the repeater 112 are possible.

Different types of data sent over the wireless packet network may require different types of service in terms of the transmission delays, frequency of errors and data throughput. For example, if the data is for a voice over IP call, the packets of data must be delivered quickly so that the recipient of the call does not notice the delay. A certain number of errors may occur in the data without noticeably effecting the quality of the voice call. As another example, a transfer of a file of data between two computers can tolerate a large delay but no errors in the data transmission can be allowed. Because of this, the wireless packet network in one embodiment of the current invention provides at least two types of service for data transfer between endpoints: minimize-delay and maximize-reliability.

The minimize-delay type of service is used for real time services that can tolerate only small delays. Examples of such services include voice over IP, interactive video, streaming video, or multimedia services that require a combination of voice, video or other data services. Data of the minimize-delay type is usually given priority over other data for transmission within the wireless packet network and over the wireless links. The maximize-reliability type is used for services that can withstand delays but require error free reception at the destination endpoint. Examples of such services include file transfers between computers, email and web browsing.

In addition to the at least two types of service, IP packets being transported in the wireless packet network may have different priority levels. In one embodiment of the present invention, at each point in the wireless packet network such as at the routers 108, repeaters 112 and communication units 120, 122, separate queues are set up for each priority level. IP packets in the higher priority queues are transmitted over the wired and wireless links before data in the lower priority queues. The type of service and priority level of each IP packet are indicated in the type of service field of the IP packet. As is well known in the art of packet data networks, the header of each IP packet contains a type of service field that can be used to indicate the type of service and priority of the packet as it travels through an IP packet network. In general, IP packets containing data of the minimize-delay type will be given a higher priority level than data of the maximize-reliability type. In addition to the minimize-delay and maximize throughput types of service, the IP packet type of service fields can also indicate a maximize-throughput, a minimize-cost and a default type of service. These types of service may also be included in some embodiments of the present invention.

In one embodiment, the wireless link 116 uses frequency division duplexing (FDD). In FDD different frequencies are used for communication from the repeaters 112 to the communication units 120, 122 (called the downlink) and from the communication units 120, 122 to the repeaters 112 (called the uplink). The multiple communication units 120, 122 share the wireless link 116 using time division multiple access (TDMA). As is well known in the art, in TDMA the wireless link 116 is divided into blocks of time called slots. The slots can be assigned to different communication units 120, 122. On the downlink, the repeaters 112 transmit continuously in each of the TDMA slots with the slots destined for the different communication units 120, 122. On the uplink the communication units 120, 122 take turns transmitting in the different TDMA slots. Although the communication units 120, 122 share the wireless link 116, the TDMA slots need not be equally distributed among the communication units 120, 122 and in fact a single radio may be assigned multiple contiguous slots.

In another embodiment of the present invention, the wireless link 116 uses time division duplexing (TDD). In TDD, the same frequencies are used by the communication units 120, 122 and the repeaters 112 for communication on the uplink and the downlink. The frequencies are divided into blocks of time for use in uplink communication and downlink communication. The blocks of time are further subdivided into time slots so that the frequency can be shared by the multiple communication units 120, 122 using TDMA in both the uplink and downlink. As with FDD, during the block of time used for uplink communication, the multiple communication units 120, 122 will take turns transmitting in the different TDMA time slots. In the block of time reserved for downlink communications, the repeaters 112 transmit continuously with the different TDMA time slots destined for different communication units 120, 122.

In one embodiment of the present invention, on the uplink five different types of TDMA slots are used: open-ended reserved slots, closed-ended reserved slots, random access slots, acknowledgement slots and disabled slots. The apportionment of the uplink TDMA slots to the different types is done by the base station 112 during a previously transmitted downlink slot. The open-ended reserved slots are used for data of the minimize-delay type such as voice over IP and streaming video. The open-ended reserved slots are assigned to one of the communication units 120, 122 at regular intervals for an indefinite amount of time. This allows the data to be transmitted with small fixed delays. For example, during a voice over IP call, slots may be reserved every 30 milliseconds for the duration of the call. The closed-ended reserved slots are used for data of the types other than the minimize-delay type. A fixed number of closed-ended slots are assigned to one of the communication units 120, 122 when it has data to transmit. During a random access slot, any of the communication units 120, 122 may transmit. However, if more than one of the communication units 120, 122 transmits during the random access slot, a collision will occur and the data in the slot will not be received by the repeater 112. The random access slots are used by the communication units 120, 122 to request the assignment of closed-ended or open-ended reserved slots or to send data of any type of service that will fit in one TDMA slot. The acknowledgement slots are used by the communication units 120, 122 to notify the repeaters 112 that previously transmitted downlink slots were received without errors. During the disabled slots, none of the communication units 120, 122 are allowed to transmit.

In one embodiment of the present invention, before the TDMA slots are transmitted over the wireless link 116, the TDMA slots are encoded with a convolutional code. Convolutional coding is a well known way to make the transmission of information across a wireless link more resistant to errors. At the transmitter the TDMA slot is encoded. At the receiver the TDMA slot is decoded using the well known Verterbi decoding algorithm or some other method. Convolutional coding adds redundancy to the transmitted information and therefore reduces the amount of information that can be transmitted over the wireless link 116. The amount of redundancy added to the information is expressed as a fraction. For example, a ¾ rate convolutional code would produce four bits of encoded output for every three bits of data. In one embodiment of the present invention a ½ rate convolutional code is used for data from the maximize-reliability and the minimize-delay type of service and a ¾ rate convolutional code for data from the maximize-throughput, minimize-cost and default type of service. Of course it will be appreciated that in other embodiments of the present invention other convolutional coding rates or other types of error correcting codes may be employed. Alternatively, no error correcting code may be used.

There are several issues associated with sending IP packets across the wireless link 116. As mentioned previously, the IP packets sent between endpoints in the wireless communication network 100 can be of varying sizes. However, according to one embodiment of the present invention, the TDMA time slots are of fixed size. Hence, the IP packets may have to be split into multiple TDMA slots. Also, multiple IP packets or parts of IP packets may be placed within a single slot to more efficiently use the TDMA slots. The wireless link 116 is more prone to errors than the wired networks traditionally used in IP networks. This makes it desirable to have some way of detecting errors across the wireless link 116 and possibly retransmitting TDMA slots or parts of slots with errors for data of the maximize-reliability type.

In general, devices running the IP protocol do not perform any type of error checking of the data carried in packets. However, destination endpoint devices running the transport control protocol (TCP) in association with IP do perform error detection. TCP is oftentimes run on top of IP so that data transported using the TCP protocol is placed within IP packets. When a destination endpoint device running TCP detects an error, the packet must be retransmitted from one endpoint to the other. If the error occurs over a wireless link in a packet that has been split into several TDMA slots, the entire IP packet is retransmitted from endpoint to endpoint even when only the portion of the IP packet contained in one of the TDMA slots contains errors. The retransmission of packets across the entire network can result in a large delay. Also, if many packets have errors, significant additional traffic in the entire communication network 100 is created. In the wired networks traditionally used for packet based communications this is not a problem since errors are relatively rare but this is not the case for a wireless link. Because of these reasons it is desirable to have retransmissions just occur over the wireless link 116 for data of the maximize-reliability type. For data of the minimize-delay type, the packets are usually discarded when errors occur over the wireless link 116 since the additional delay entailed by retransmission makes the retransmitted data worthless.

FIGS. 2–9 show the format of the TDMA slots used to send packets of data across the wireless link 116 according to one embodiment of the present invention. Generally, the slot format allows the base stations 112 to distribute the access of the uplink portion of the wireless link 116 among the different communication units. It supports the transmission of multiple types of data over the wireless link 116 and allows the packets of data to be segmented to fit within the TDMA slots. It also provides for the acknowledgement of the correct transmission of data over the wireless link 116 when the type of the data requires error free transmission. In one embodiment, the acknowledgement technique is asymmetric on the uplink and downlink of the wireless link 116. On the downlink, acknowledgements are done within the slot header of each TDMA slot. On the uplink acknowledgements for many TDMA slots are done in dedicated acknowledgement slots.

Figure 2:
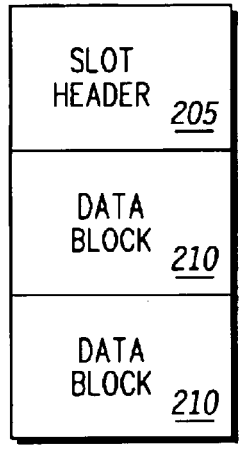
FIG. 2 shows a format for the time division multiple access slots for use over wireless links in a communication network according to one embodiment of the present invention.

There is shown in FIG. 2, the basic format of the TDMA slots according to one embodiment of the present invention. The top of FIG. 2 represents the part of the TDMA slot occurring earliest in time and the bottom represents the part of the TDMA slot occurring latest in time. In one embodiment, the TDMA slot is divided into three parts: a slot header 205 and two data blocks 210. The slot header contains information used by the sending device for identifying the sending and receiving devices, an identification of the IP packet or parts of the IP packet carried by the TDMA slot, acknowledgement of correct reception of previous packets (downlink only) and uplink TDMA slot type. The data blocks 210 contain data from the IP packets that are being transmitting over the wireless link 116.

Figure 3:
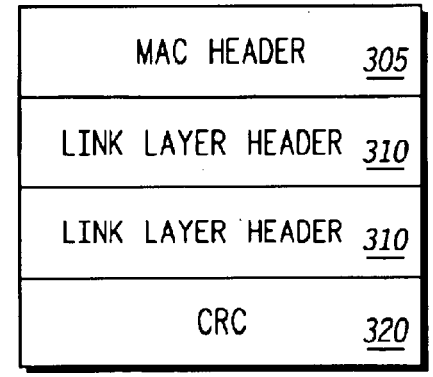
FIG. 3 shows a format of the slot header for time division multiple access slots according to one embodiment of the present invention.

FIG. 3 shows in more detail the slot header 205 for the TDMA slots according to one embodiment of the present invention. The slot header 205 comprises a medium access control (MAC) header 305, two link layer headers 310 and a cyclic redundancy check (CRC) 320. In one embodiment, as will be described in greater detail in relation to FIG. 4 and FIG. 5, the MAC layer header 305 is slightly different for the uplink and downlink TDMA slots and contains information identifying the source and destination radios and uplink slot type. The two link layer headers 310 provide information identifying the part of the IP packet being carried in the two data blocks. They also provide acknowledgement of error free reception of some of the data blocks 210 in previously received TDMA uplink slots. The CRC 320 allows for the detection of errors in the slot header 205 during transmission over the wireless link 116. CRCs are well-known in the art and will not be described in detail herein.

Figure 4:
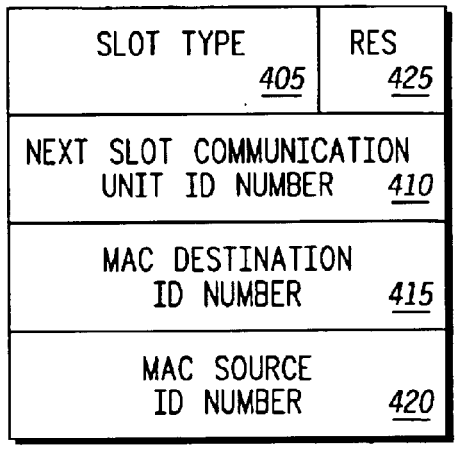
FIG. 4 shows a format of the medium access control header of time division multiple access slots according to one embodiment of the present invention.

As shown in FIG. 4, the MAC header 305 for the downlink contains a slot type 405, a next slot communication unit identification number 410, a MAC destination identification number 415, a MAC source identification number 420 and a reserved area 425. The slot type 405 identifies the slot type of a future uplink TDMA slot. As explained earlier, the uplink slots can be of five different types: random access, open-ended reserved, closed-ended reserved, acknowledgement and disabled. The next slot communication unit identification number 410 is the identification number of the communication unit 120, 122 that is allowed to transmit on a future uplink slot. In one embodiment, the slot type 405 and next slot communication unit identification number 410 refer to the uplink slot that begins one and a half TDMA slot periods after the downlink slot. When the next uplink slot is a random access slot or a disabled slot, the next slot communication unit identification number 410 is not valid. The MAC destination identification number 415 is the identification number of the communication unit 120, 122 for which the data in the TDMA downlink slot is destined. The MAC source identification number 420 is the identification number of the repeater 112 that is transmitting the TDMA slot. The reserved area 425 is not currently used but may be used for some purpose in future versions of the wireless communication system 100.

Figure 5:
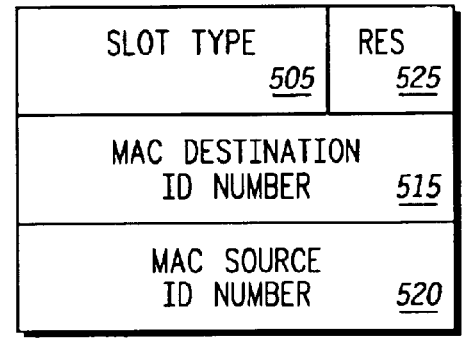
FIG. 5 shows another format of the medium access control header of time division multiple access slots according to one embodiment of the present invention.

FIG. 5 shows the MAC header 305 for uplink TDMA slots. The uplink MAC header 305 comprises a slot type 505, a MAC destination identification number 515, a MAC source identification number 520 and one or more reserved areas 525. The slot type 505 identifies the type of the TDMA uplink slot that is being transmitted by the communication unit 120, 122. These slot types comprise all of the five TDMA slot types listed above for the downlink slot type 405 except for the disabled slot. The MAC destination identification number 515 is the identification number of the repeater 112 for which the data in the TDMA uplink slot is destined. The MAC source identification number 520 is the identification number of the communication unit 120, 122 that is transmitting the TDMA slot. The reserved area 525 is not currently used but may be used for some purpose in the future if the wireless communication system 100 is revised. Unlike the downlink MAC header of FIG. 4, the uplink MAC header of FIG. 5 does not contain a next slot communication unit identification number 410. This was needed in the downlink MAC header so that the future uplink slots can be assigned to the different communication units 120, 122 by the repeater 112. Since the downlink slots are not shared among multiple repeaters 112, there is no need to assign the downlink slots in the MAC header.

Figure 6:
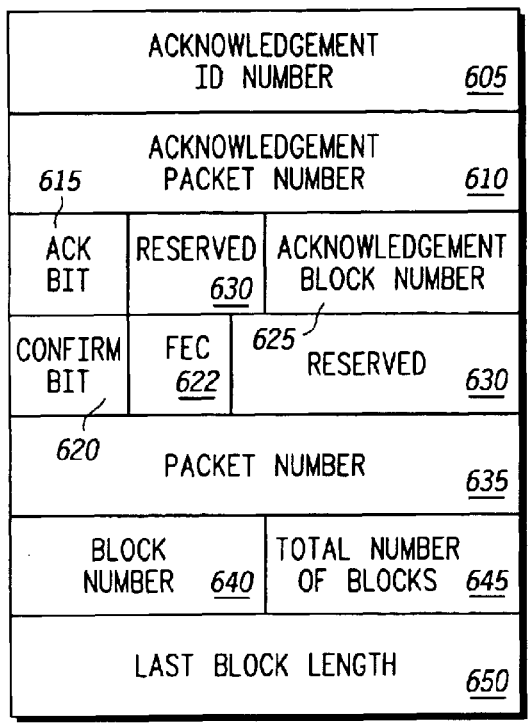
FIG. 6 shows a format of the link layer header of time division multiple access slots according to one embodiment of the present invention.

FIG. 6 shows in more detail the link layer headers 310 for the downlink TDMA slots. The format of the downlink link layer headers is the same for both data blocks 210. The information in one of the link layer headers 310 corresponds to one of the data blocks 210 and the information in the other link layer header 310 corresponds to the other data block 210. The link layer header 310 comprises one or more reserved fields 630, an acknowledgement identification number 605., an acknowledgement packet number 610, an acknowledgement bit 615, a confirmation bit 620, an FEC field 622, an acknowledgement block number 625, a packet number 635, a block number 640, a total number of blocks 645 and a last block length 650. The one or more reserved fields 630 are not currently used but may be used for some purpose in the future if the wireless communication system 100 is revised.

One of the purposes of the downlink link layer header 310 is to identify the portion of the IP packet being carried by the corresponding data block 210. As explained previously, when IP packets are carried over wireless links, they are oftentimes too big to be carried in a TDMA slot or within one of the data blocks of a TDMA slot. When the IP packets are too big to be carried in one of the data blocks 210 of the TDMA slot, the IP packets are split into segments and are carried within multiple data blocks 210 that may span many TDMA slots 200. When the IP packets are carried over the wireless links they are assigned a packet number. Each of the segments of each of the IP packets is also assigned a segment number. This makes it possible for the receiving radio to reassemble the IP packet in the correct order from the data carried in the different blocks. The parts of the link layer header 310 that are used to identify the portion of the IP packet carried by the corresponding data block comprise the packet number 635, the block number 640, the total number of blocks 645 and the last block length 650. The packet number 635 is the number of the IP packet or portion of the IP packet being transported in the data block to which the link layer header corresponds. The block number 640 is the number of the segment of the IP packet being transmitted in the data block to which the link layer header corresponds. The total number of blocks 645 is the number of segments that the IP packet being transported in the data block has been divided into. The last block length 650 specifies the amount of the data in the last segment of the IP packet. This is needed so the repeaters 112 or communication units 120, 122 receiving the data block can determine the location of the end of the last IP packet segment in the data block 210.

The link layer header 310 in downlink TDMA slots is also used for the acknowledgement of the correct receipt of data blocks 210 in previous uplink TDMA slots. However, since only some of the data blocks must be acknowledged, there isn't a need to place acknowledgement information in every downlink TDMA slot. When there is no acknowledgement information to place within a downlink TDMA slot, the parts of the link layer header 310 used for acknowledgments are not used. The parts of the link layer header 310 that are used for acknowledgements comprise the acknowledgement identification number 605, the acknowledgement packet number 610, the acknowledgement bit 615 and the acknowledgement block number 625. The acknowledgement bit 615 indicates whether the other acknowledgement fields in the link layer header 310 are valid. The acknowledgement identification number 605 identifies the communication unit 120, 122 for which the acknowledgement information in the link layer header 310 is destined. This may be different from the communication unit 120, 122 for which the data in the TDMA slot is destined. The acknowledgement packet number 610 is the number of the IP packet that was being carried by the data block being acknowledged. The acknowledgement block number 625 is the segment number of the segment of the IP packet that was being carried by the block being acknowledged.

There are two additional fields in the downlink link layer header 310 that are used by the communication unit 120, 122 receiving the TDMA slot to determine how to process the data in data block 210 corresponding to the link layer header 310: the confirmation bit 620 and the forward error correction (FEC) field 622. The confirmation bit 620 indicates whether the communication unit 120, 122 should acknowledge error-free receipt of the data block 210 to which the link layer header 310 corresponds in the current downlink TDMA slot. If the confirmation bit 620 is set, the communication unit will acknowledge the error-free reception of the corresponding data block 210. If the confirmation bit is not set, the communication unit 120, 122 will not send an acknowledgment of the error-free reception of the corresponding data block 210 to the repeater 112. The forward error correction field 622 indicates what kind of error correcting code was used to encode the data block 210 corresponding to the link layer header 310.

Figure 7:
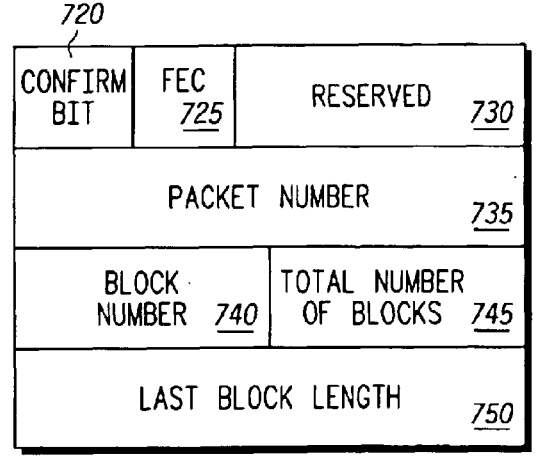
FIG. 7 shows another format of the link layer header of time division multiple access slots according to one embodiment of the present invention.

FIG. 7 shows the link layer headers 310 for the uplink TDMA slots in more detail. The uplink TDMA slot link layer header 310 comprises a confirmation bit 720, a forward error correction bit (FEC) bit 725, a packet number 735, a block number 740, a total number of blocks 745 and a last block length 750. These fields of the uplink TDMA slot link layer headers 310 have the same function as the corresponding fields for the downlink TDMA slot link layer headers discussed previously with regard to FIG. 6.

Figure 8:
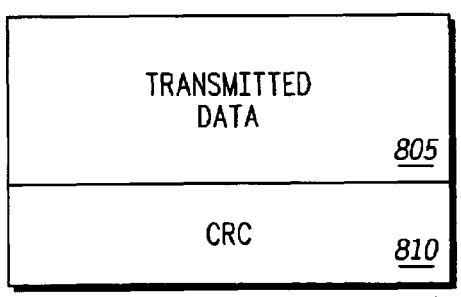
FIG. 8 shows a format of the data blocks of time division multiple access slots according to one embodiment of the present invention.

FIG. 8 shows the format of the data blocks 210. The data blocks 210 comprise transmitted data 805 and a CRC field 810. The transmitted data field 805 contains the segment of an IP packet that is being transmitted in the data block. The CRC field 810 contains a CRC sum that is used to check for errors in the transmitted data field 805 that occur during the transmission of the data block 210 over the wireless link 116. When the CRC detects an error, the transmitted data 805 is discarded by the repeater 112 or communication unit 120, 122.

If the confirmation bit (620 for a downlink TDMA slot or 720 for a uplink TDMA slot) in the link layer header 310 corresponding to the data block 210 is set, the correct reception of the segment of the IP packet sent in the data block 210 is acknowledged if no errors are detected by the CRC. If the CRC detects an error or if the confirmation bit (620 for a downlink TDMA slot or 720 for a uplink TDMA slot) is not set, no acknowledgement for the data block 210 is sent. Acknowledgements are performed differently for data in the uplink and downlink TDMA slots. For the uplink data blocks 210, the acknowledgements are sent as part of the link layer header 310 (FIG. 6) as described above. For downlink data blocks, the acknowledgements are sent in one of the data blocks 210 of an uplink TDMA slot as described hereafter.

Figure 9:
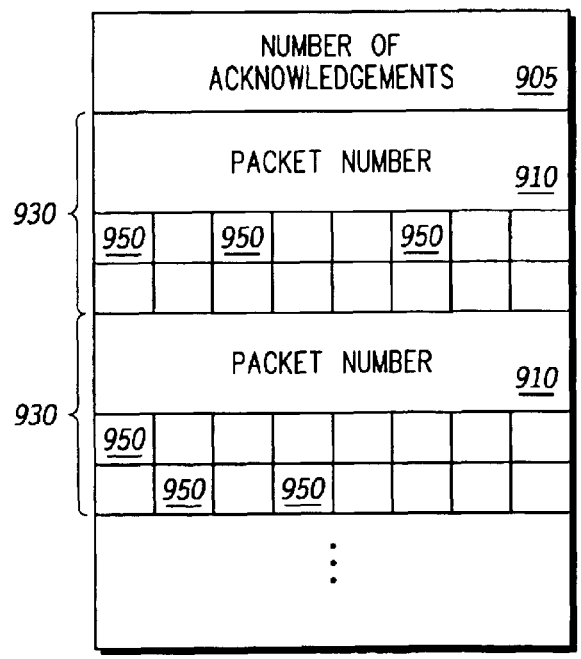
FIG. 9 shows a format of an acknowledgement data structure of time division multiple access slots according to one embodiment of the present invention.

FIG. 9 shows an acknowledgement data structure 900 that is placed in one or more of the data blocks 210 of an uplink TDMA slot 200. The acknowledgement data structure 900 can be used by the communication units 120, 122 to acknowledge the correct receipt of multiple segments of several different IP packets. As was explained above, each segment of the IP packets is carried in a different data block 210 of the TDMA slots. Each IP packet has a packet number and each segment of each IP packet has a segment number. The acknowledgement data structure contains a number of acknowledgements field 905, one or more packet number fields 910 and one or more sets of segment acknowledgement indicators 915. The number of acknowledgements field 905 contains the number of IP packets that are being acknowledged in the acknowledgement data structure 900. The packet number field 910 and the set of block acknowledgement indicators 915 always occur as a corresponding pair 930, 932. Although two of the corresponding pairs 930, 932 are shown for illustration purposes, the acknowledgement data structure 900 can contain any number of corresponding pairs. In each of the corresponding pairs 930, 932, the packet number field 910 lists the IP packet number of the IP packet being acknowledged and the set of segment acknowledgement indicators 915 indicate which segments of the IP packet were received error-free and which had errors. The set of segment acknowledgement indicators 915 is made up of a number of segment acknowledgement indicators 950. Each segment acknowledgement indicator 950 is a bit that indicates whether or not one of the segments of the IP packet were received error-free.

Once the acknowledgement data structure 900 is received by a repeater 112, the repeater 112 determines which segments of the IP packets listed in the acknowledgement data structure were received in error by consulting the corresponding segment acknowledgement indicators. The data blocks 210 containing those IP packet segments are then retransmitted.

It will be appreciated that other embodiments are possible without departing from the scope of the present invention. For example, different types of data can be transported in the wireless communication system 100. Other devices and networks besides the repeaters 112, the core equipments sites 106, and routers 108, etc. can be attached to the communications network 110. The communication network can be interconnected with other packet based networks or the Internet. Different numbers of data blocks can be present in the TDMA slot 200 other than the two data blocks described. Of course if there are other than two data blocks, the number of link layer headers will also be changed appropriately. The order of the various parts of the MAC header 305 and the link layer headers 310 can be changed and additional fields can be added. Other methods of detecting errors in the slot header 205 and data blocks 210 other than the CRC can be employed. The rates used for the convolutional coding can be other than ¾ or ½. Methods of performing error correcting encoding and decoding of the transmitted data 805 other than convolutional coding and Verterbi decoding can be employed. Alternately, no error correcting coding at all can be employed. Acknowledgements may be done for entire TDMA time slots 200 or data blocks 210 rather than for segments of IP packets. Data blocks 205 can carry data other than segments of IP packets and the uplink acknowledgement structure 900. Additional types of uplink TDMA slots can be specified. Negative acknowledgments of data blocks found to have errors can be done in addition to or instead of acknowledging error-free reception of data blocks.

Other methods of performing acknowledgements of downlink IP packet segments can also be used rather than placing the acknowledgement data structure 900 in the data block 210 part of an uplink TDMA slot 200. A completely different TDMA slot structure not using the same slot header 205 can be used. A different format of acknowledgement data structure 900 can be defined. The acknowledgement indications can be placed within the TDMA slot header 205 rather than in an acknowledgement data structure.

Figure 10:
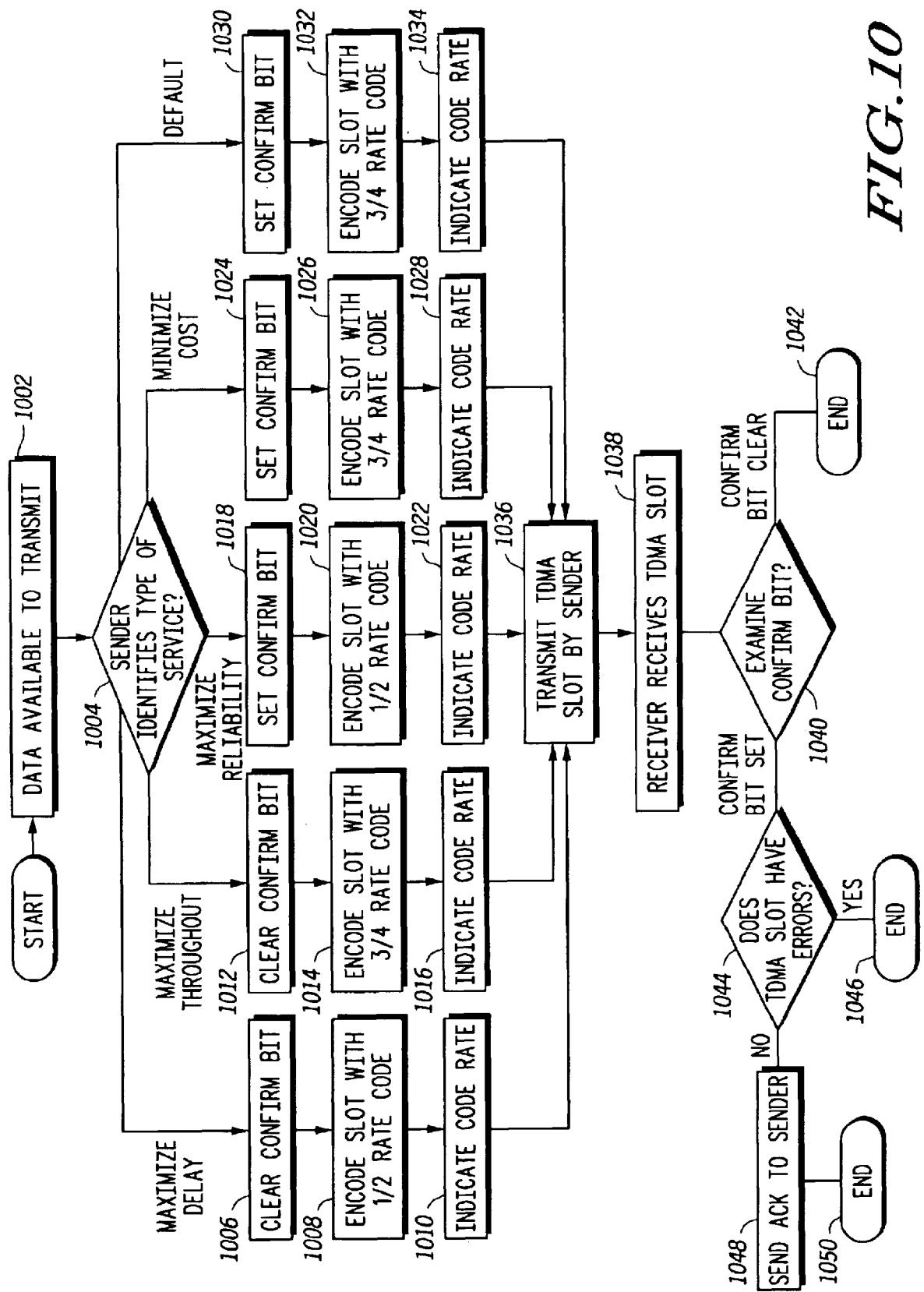
FIG. 10 is a flowchart illustrating different acknowledgment requirements/modes corresponding to different types of service according to one embodiment of the present invention.

FIG. 10 is a flowchart illustrating different acknowledgment requirements/modes corresponding to different types of service. The process begins at step 1002 when the sending device has data that comprises a portion of a packet available to transmit to a receiving device. The receiving and sending devices may comprise communication units 120, 122, repeaters 112 or other devices using TDMA slots having the formats shown in FIGS. 2–9. At step 1004, the sending device identifies the type of service of the data to be transmitted. In one embodiment, the type of service comprises one of: minimize delay, maximize throughput, maximize reliability, minimize cost and default services. Based on type of service, the sending device determines if acknowledgment of the error-free reception of the data is required. In one embodiment, acknowledgments are required for data of the maximize reliability, minimize cost and default services and not required for the minimize delay and maximize throughput services. If acknowledgment is not required, the confirmation bit (FIG. 6) for downlink TDMA slots, 720 (FIG. 7) for uplink TDMA slots is cleared in steps 1006, 1012 for the minimize delay and maximize throughput services. If acknowledgment is required, the confirmation bit is set in steps 1018, 1024 and 1030 for the maximize reliability, minimize cost and default services. The rate used for the error correcting convolutional code is also dependent on the type of service of the data. A ½ rate code is used for the minimize delay and maximize reliability services and a ¾ rate code is used for the maximize throughput, minimize cost and default service.

For the minimize-delay service, the sending device clears the confirmation bit in the link layer TDMA header 310 at step 1006. At step 1008, the sending device encodes the data using a ½ rate convolutional code and then indicates the code rate in the FEC field (622 for downlink TDMA slot, 725 for uplink TDMA slot) at step 1010. For the maximize-throughput service, the sending device clears the confirmation bit in the link layer TDMA header 310 at step 1012. At step 1014, the sending device encodes the data using a ¾ rate convolutional code and then indicates the code rate in the FEC field. For the maximize-reliability service, the sending device sets the confirmation bit in the link layer TDMA header 310 at step 1018. At step 1020, the sending device encodes the data using a ½ rate convolutional code and then indicates the code rate in the FEC field at step 1022. For the minimize-cost service, the sending device sets the confirmation bit in the link layer TDMA header 310 at step 1024. At step 1026, the sending device encodes the data using a ¾ rate convolutional code and then indicates the code rate in the FEC field at step 1028. For the default service, the sending device sets the confirmation bit in the link layer TDMA header 310 at step 1030. At step 1032, the sending device encodes the data using a ¾ rate convolutional code and then indicates the code rate in the FEC field at step 1034. After the code rate is indicated at step 1010, 1016, 1022, 1028 or 1034, the data is placed into the TDMA slot and the sending device transmits the TDMA slot over the wireless link 116 at step 1036.

At step 1038, the receiving device receives the TDMA slot. The receiving device then examines the confirmation bit of the received TDMA slot header at step 1040 to determine whether acknowledgment of error-free reception of the data is required. If the confirmation bit is clear, the receiving device processes the data and the process ends at step 1042. If the confirmation bit is set, the receiving device checks to see if there are errors in the data of the TDMA slot at step 1044. If the data has errors, the data is discarded and the process ends at step 1046. If at step 1044 the data has no errors, an acknowledgement is sent to the sending device at step 1048 and the process ends at step 1050.

Figure 11:
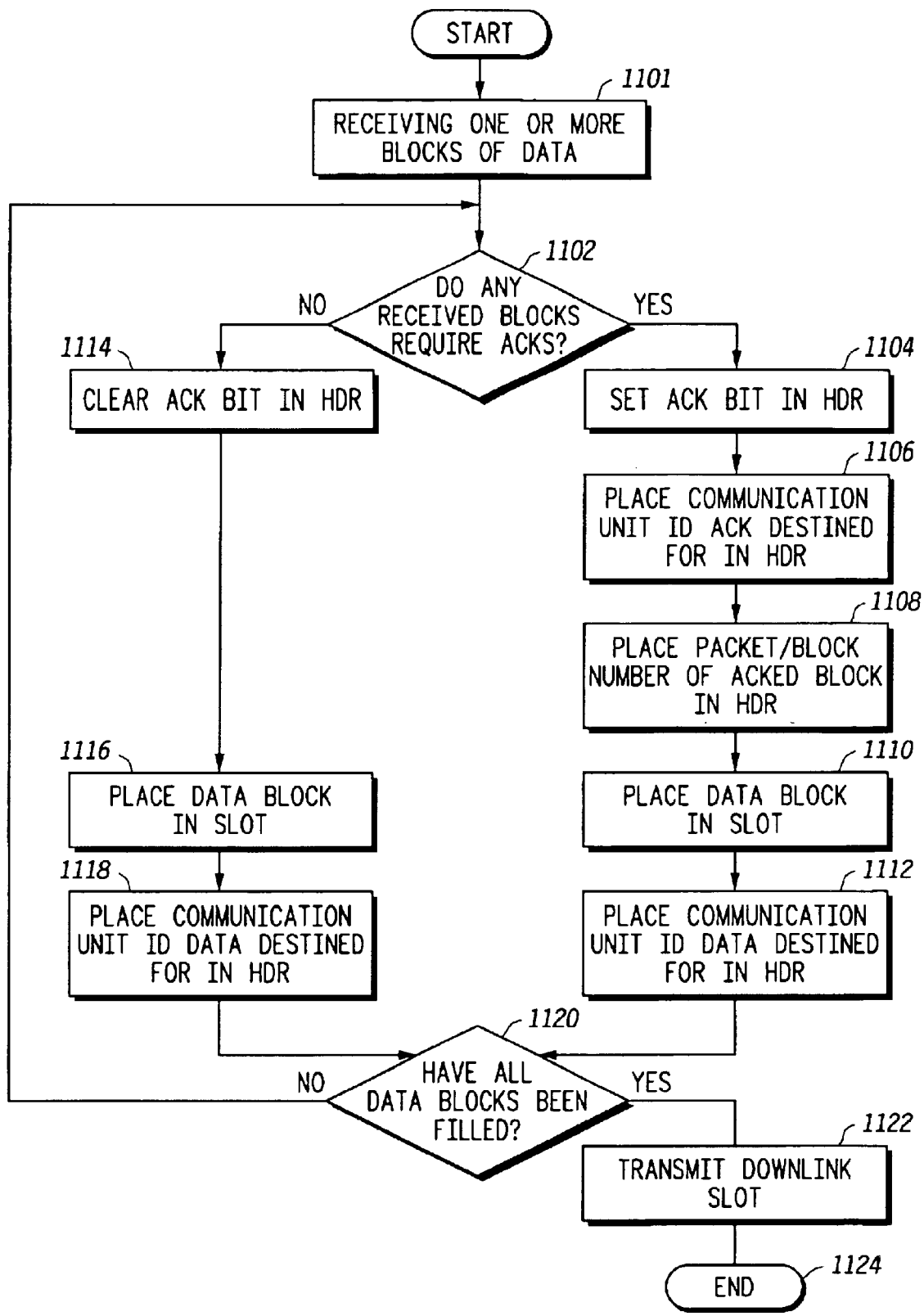
FIG. 11 is a flowchart illustrating how acknowledgement information and data are placed into a downlink TDMA slot by a sending device according to one embodiment of the present invention.

FIG. 11 is a flowchart illustrating how acknowledgement information and data are placed into a downlink TDMA slot by a repeater, communication unit or other device capable of TDMA communication. For convenience, the steps of FIG. 7 will be described as being performed by a repeater but it will be appreciated that the steps of FIG. 7 may be performed by any sending device such as a communication unit, repeater, cell phone, radio, wireless modem, etc. At step 1101, the repeater 112 receives one or more blocks of data from one or more communication units 120, 122. In step 1102, the repeater 112 determines if any data blocks received from the communication units 120, 122 require acknowledgement. Each of the data blocks received from the communication units 120, 122 is a portion of an IP packet that can be uniquely identified by a combination of a packet number and block number.

If a data block requires acknowledgement, the repeater sets an acknowledgement bit 615 in the link layer header 310 (FIG. 6) at step 1104. At step 1106, the repeater places the identification number of the communication unit 120, 122 that sent the data block to the repeater in the acknowledgement identification number field 605 of the downlink link layer header 310. At step 1108, the repeater places the number of the packet of which the data block is a part into the acknowledgment packet number field 610 of the link layer header 310 and the number of the segment of the packet carried in the data block into the acknowledgment block number field 625 of the downlink link layer header 310. The packet number field 610, acknowledgment block number field 625, acknowledgment identification number field 605 and acknowledgment bit 615 together or individually comprise indicia of acknowledgment that identify the block of data being acknowledged. Next, at step 1110 the repeater places data into one of the data blocks 210 of the TDMA slot. This data may be targeted for the same or a different communication unit 120, 122 than the indicia of acknowledgment. At step 1112, the repeater enters the identification number of the communication unit 120, 122 for which the data placed into the data block 210 is destined for into the MAC destination identification number field 415 (FIG. 4) of the MAC header 305.

If at step 1102 there are no data blocks previously received by the repeater that require acknowledgement, the repeater clears the acknowledgment bit 615 in the link layer header 310 at step 1114. Next, at step 1116 the repeater places data into one of the data blocks 210 of the TDMA slot 200. At step 1118, the repeater enters the identification number of the communication unit 120, 122 for which the data placed into the data block 210 is destined into the MAC destination identification number field 415 of the MAC header 305. After the communication unit identification number is placed into the TDMA slot in steps 1118 or 1112, the repeater checks to see that all of the data blocks 210 in the TDMA slot have been filled at step 1120. In the TDMA slot format shown in FIGS. 2–9 each TDMA slot contains two data blocks. However it will be appreciated that in other embodiments other numbers of data blocks may be present in the TDMA slots. If at step 1120 there are data blocks 210 in the TDMA slot that have not been filled, the repeater repeats the process of steps 1102–1120 until all data blocks 210 in the TDMA slot are filled. If all data blocks 210 in the TDMA slot have been filled, the repeater transmits the TDMA slot over the wireless link at step 1122 and the process ends at step 1124.

Figure 12:
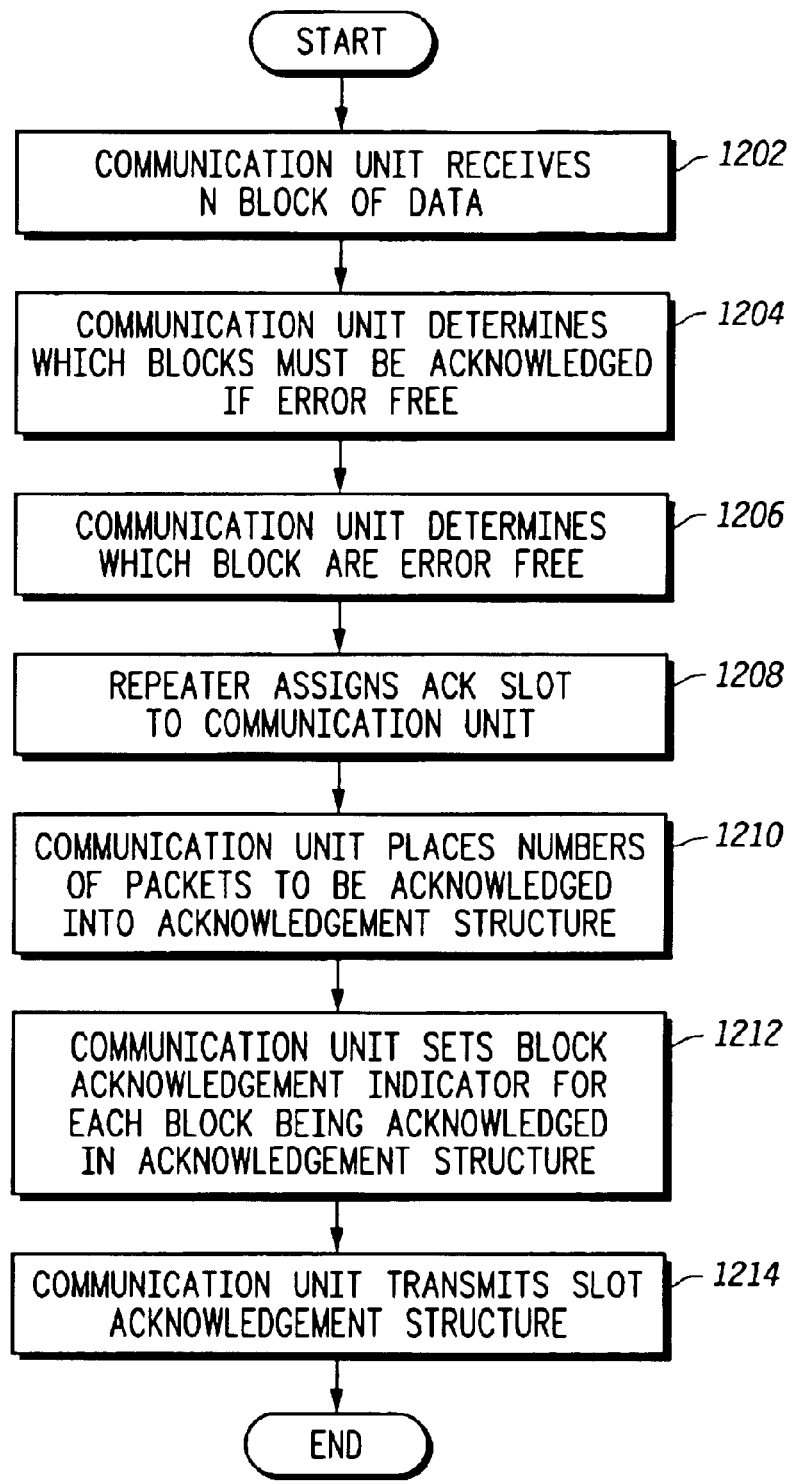
FIG. 12 is a flowchart illustrating how a communication unit acknowledges error-free reception of multiple data blocks according to one embodiment of the present invention.

FIG. 12 is a flowchart illustrating how a communication unit 120, 122 acknowledges error-free reception of multiple data blocks that were received in TDMA slots having the format shown in FIGS. 2–9 according to one embodiment of the present invention. At step 1202 the communication unit 120, 122 receives N blocks of data. These blocks of data may be received within multiple TDMA slots and may contain portions of multiple packets received in a plurality of TDMA time slots. The communication unit 120, 122 determines which of the N blocks of data must be acknowledged if they are received error-free at step 1204. In one embodiment, this determination is made by the communication unit 120, 122 by consulting the confirmation bit 620 (FIG. 6) of the downlink link layer header corresponding to each data block 210. If the confirmation bit 620 is set, the communication unit acknowledges reception of the corresponding data block if it is received error-free by placing indicia of acknowledgment for these data blocks within an acknowledgment structure that is sent within an allocated acknowledgment slot. At step 1206, the communication unit 120, 122 then determines which of the N data blocks are error-free. Hence after steps 1204 and 1206 the communication unit 120, 122 has determined a subset of the N blocks of data that must be acknowledged because of their error status and the confirmation bit 620. At step 1208 a repeater 112 allocates an acknowledgment TDMA slot for use by the communication unit 120, 122. The communication unit 120, 122 then places the numbers of all the packets that have segments carried in the data blocks to be acknowledged into the packet number fields 910 (FIG. 9) of an acknowledgement data structure 900 at step 1210. At step 1212, the communication unit sets the segment acknowledgment indicator 950 corresponding to the segment of a packet carried within each of the blocks of data being acknowledged. For example, if the data block containing segment 6 of packet 12 is being acknowledged, a 12 will be placed in the packet number field 910 and the sixth segment acknowledgment indicator of the corresponding set of acknowledgment indicators will be set. The acknowledgment structure 900 is then placed into a TDMA slot and transmitted by the communication unit 120, 122 over the wireless link 116 at step 1214.

Figure 13:
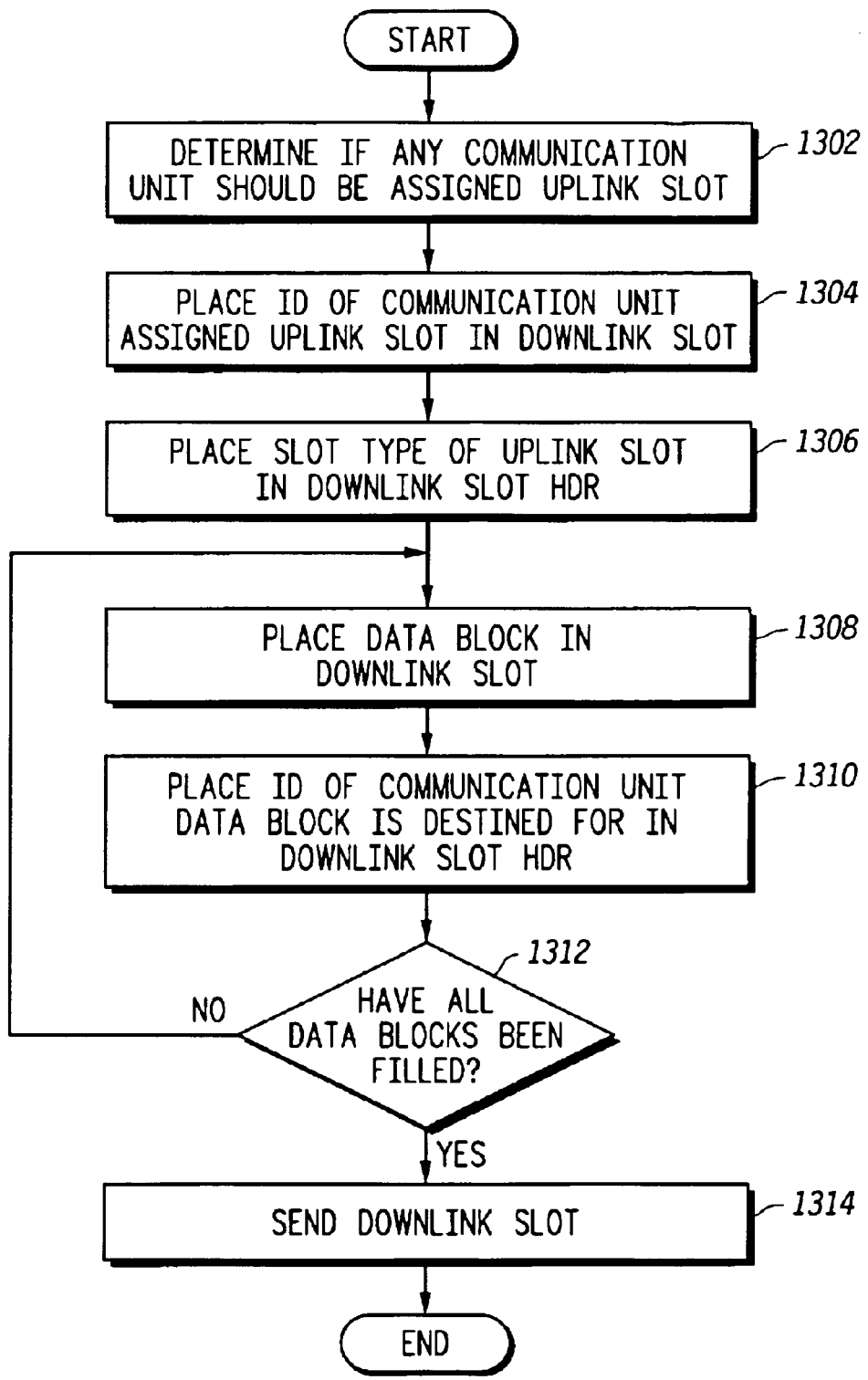
FIG. 13 is a flowchart showing how a repeater can assign an uplink slot to a first communication unit in the downlink TDMA slot containing data destined for a second communication unit according to one embodiment of the present invention.

FIG. 13 is a flowchart showing how a repeater 112 can assign an uplink slot to a first communication unit 120, 122 in the same downlink TDMA slot containing data blocks 210 destined for a second communication unit 120, 122 according to one embodiment of the present invention. At step 1302, a repeater 112 determines that a first communication unit 120, 122 should be assigned a future uplink TDMA slot. Then at step 1304, the repeater 112 places the identification number of the first communication unit 120, 122 into the next slot communication unit identification number field 410 (FIG. 4) of a downlink TDMA slot. At step 1306, the repeater places the slot type of the future uplink TDMA slot being assigned to the first communication unit 120, 122 in the downlink TDMA slot in the slot type field 405. At step 1308, the repeater places a data block 210 destined for a second communication unit 120, 122 into the downlink TDMA slot in step 1308. At step 1310, the repeater enters the identification number of the second communication unit 120, 122 into the TDMA slot in the MAC destination identification number field 415. At step 1312, a check is made to see if all data blocks in the slot have been filled. While the slot format of FIGS. 2–9 contains two data blocks, in other embodiments of the present invention, other numbers of data blocks may be present. At step 1312, if not all data blocks have been filled, steps 1308 and 1310 are repeated until all of the data blocks in the TDMA slot have been filled. If all data blocks have been filled, the downlink TDMA slot is sent over the wireless link 116 by the repeater 112 in step 1314.

Figure 14:
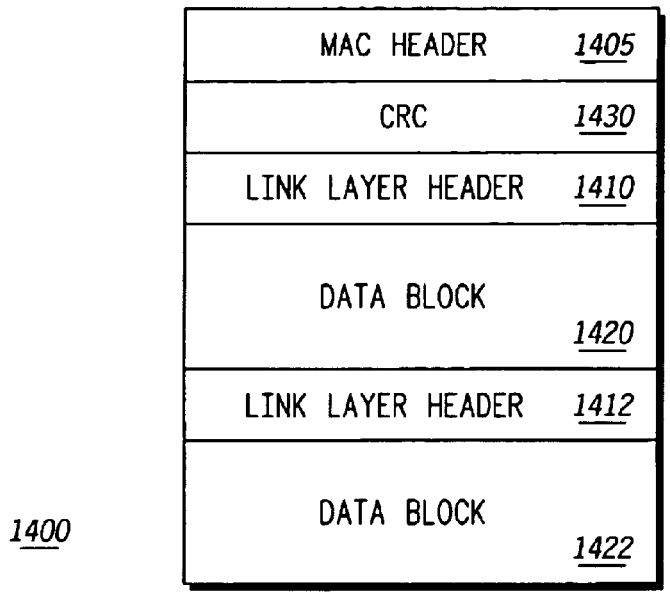
FIG. 14 shows a format for the time division multiple access slots for use over wireless links in a communication network according to one embodiment of the present invention.

FIG. 14 shows a TDMA slot 1400 according to another embodiment of the present invention. The TDMA slot 1400 comprises a MAC header 1405, two link layer headers 1410, 1412, two data blocks 1420, 1422 and a CRC 1430. The MAC layer header contains information for identifying the devices sending and receiving the TDMA slot 1400 as well as the allocation of future uplink TDMA slots. In one embodiment, the MAC header 1405 can have the formats shown in FIG. 4 for the downlink and FIG. 5 for the uplink. The link layer headers 1410, 1412 contain information for identifying the packet and segment of a packet contained in the corresponding data block 1420, 1422 as well as information relating to acknowledgments of error-free reception. In one embodiment, the link layer headers 1410, 1412 have the formats shown in FIG. 6 for the downlink and FIG. 7 for the uplink. The first link layer header 1410 in the TDMA slot 1400 corresponds to the first data block 1420 in the slot and the second link layer header 1412 in the slot corresponds to the second data block 1422 in the slot. Each data block 1420, 1422 contains a portion of a packet. In one embodiment, the data blocks 1420, 1422 have the format shown in FIG. 8. In one embodiment, the CRC in the data blocks (810 of FIG. 8) may be used to detect errors in both the data block 1420, 1422 and corresponding link layer header 1410, 1412. In other embodiments, separate CRC fields may be added to the TDMA slot to detect errors in the link layer headers. While only two link layer headers 1420, 1412 and data blocks 1420, 1422 are shown, it will be appreciated the TDMA slot 1400 may contain more link layer headers and data blocks. The CRC field 1430 is used to perform a cyclic redundancy check to detect errors in the MAC layer header 1405.

Figure 15:
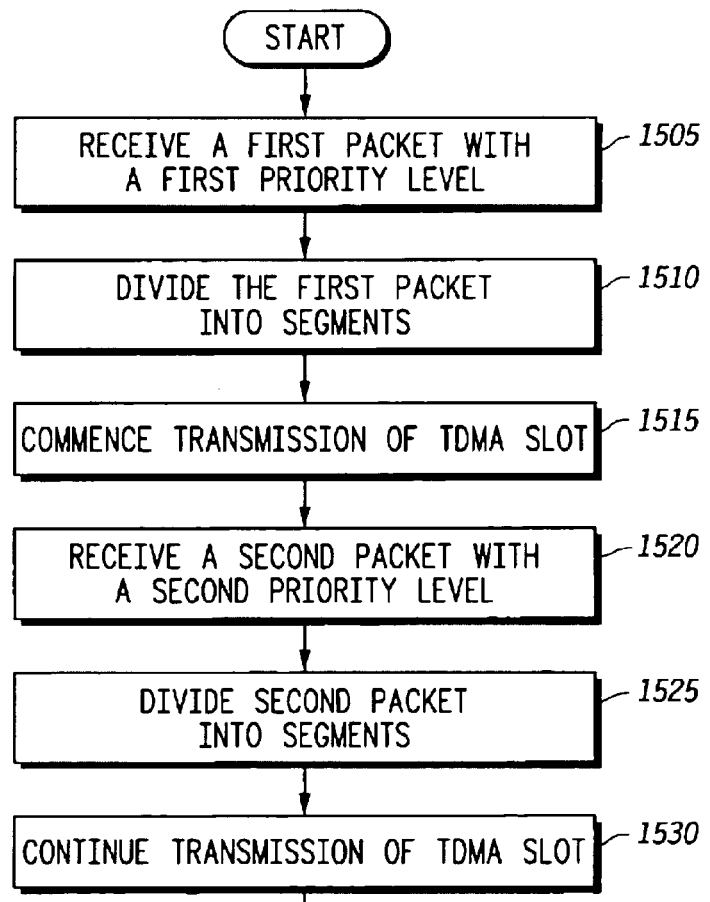
FIG. 15 is a flowchart showing how a sending device interrupts the transmission of a packet within a TDMA slot to begin transmission of a higher priority packet according to one embodiment of the present invention.

FIG. 15 is a flowchart illustrating how a sending device interrupts the transmission of a packet within a TDMA slot to begin transmission of a higher priority packet according to one embodiment of the present invention. This embodiment makes use of the TDMA slot format of FIG. 14. As mentioned earlier, IP packets being transmitted over the wireless link 116 must be divided into segments to be transported in TDMA slots. Each segment of an IP packet is carried in separate data blocks 1420, 1422 of the TDMA slots and segments of an IP packet may be carried in multiple TDMA slots. Each IP packet has a priority level. When the sending device sends the TDMA slot across the wireless link 116, it always sends the highest priority segment of a packet first. Hence the arrival of a higher priority level packet may cause the interruption of the transmission of a lower priority packet at segment boundaries.

At step 1505, the sending device receives a first packet with a first priority level. The sending device then divides the first packet into segments at step 1510. At step 1515, the sending device commences transmission of a TDMA slot. The TDMA slot contains at least one segment of the first packet in a data block 1420, 1422. After the transmission of the time slot has begun but before all of the data blocks 1420, 1422 have been transmitted, the sending device receives a second packet with a second priority level at step 1520. The second priority level is higher than the first priority level. At step 1525, the sending device divides the second packet into segments. At step 1530, the sending device places a segment of the second packet into the TDMA slot and continues transmitting the TDMA slot. The process ends after the entire TDMA slot has been transmitted.

The present invention provides for the efficient transfer of IP based packetized data between endpoints of a communication system that includes one or more wireless links. The invention defines a method for providing multiple types of data services over the wireless link(s). When traveling over the wireless link(s), the multiple types of data may be given different priorities and different levels of error correcting convolutional codes. The invention counteracts the error prone nature of the wireless links by providing an acknowledgement and retransmission scheme for some types of data. In one embodiment, the acknowledgement scheme differs for the uplink and the downlink because of the asymmetric nature of the wireless link.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes that come within the meaning and range of equivalency of the claims are to be embraced within their scope.

What is claimed is:

1. A method comprising:

identifying, for a packet to be transmitted over a wireless link, a type of service from among at least a first and second type of service wherein the first type of service comprises a minimize-delay service and the second type of service comprises a maximize-reliability service;

determining an acknowledgement requirement corresponding to the type of service further comprising: a) if the packet is associated with the first type of service, not requiring acknowledgement of a slot by a receiving device: and b) if the packet is associated with a second type of service, requiring acknowledgement of the slot by the receiving device;

sending the slot comprising at least a portion of the packet from a sending device to the receiving device further comprising: a) if the packet is associated with the first type of service, encoding the at least a portion of the packet using an error correcting code of a first rate: and b) if the packet is associated with the second type of service, encoding the at least a portion of the packet using an error correcting code of a second rate;

performing, by the receiving device, the acknowledgement requirement corresponding to the type of service, based on an error status of the slot further comprising a) not acknowledging reception of the slot associated with the minimize-delay service; and b) acknowledging reception of slot associated with the maximize-reliability service, if the slot is received without error.

2. The method of claim 1, wherein the step of performing the acknowledgement requirement is comprises the receiving device:

not acknowledging reception of slots associated with minimize-delay service; and acknowledging reception of slots associated with default service, if the slots are received without error.

3. The method of claim 1, wherein the step of determining an acknowledging requirement is accomplished by the sending device, the method further comprising sending, from the sending device to the receiving device, indicia of the acknowledgement requirement.

4. The method of claim 1, wherein the step of determining an acknowledgement requirement is accomplished by the receiving device.

5. The method of claim 1, wherein the error correcting code of the first rate comprises a rate ¾ convolutional code and the error correcting code of the second rate comprises a rate ½ convolutional code.

6. The method of claim 1 wherein the sending device comprises a repeater and the receiving device comprises a communication unit.

7. The method of claim 1 wherein the sending device comprises a communication unit and the receiving device comprises a repeater.

* * * * *